United States Patent [19]
Decker

[11] Patent Number: 5,946,320
[45] Date of Patent: Aug. 31, 1999

[54] METHOD FOR TRANSMITTING PACKET DATA WITH HYBRID FEC/ARG TYPE II

[75] Inventor: Peter Decker, Marl, Germany

[73] Assignee: Nokia Mobile Phones Limited, Salo, Finland

[21] Appl. No.: 08/725,250

[22] Filed: Oct. 4, 1996

[30] Foreign Application Priority Data

Oct. 23, 1995 [EP] European Pat. Off. ............ 95 116 686

[51] Int. Cl.$^6$ .......................... H04L 12/54; G08C 25/02
[52] U.S. Cl. ............................................. 370/428; 371/32
[58] Field of Search .................................. 370/337, 347, 370/349, 428, 471, 474; 371/33, 35, 32, 37.01, 37.02, 37.7, 37.03, 37.04

[56] References Cited

U.S. PATENT DOCUMENTS

| | | | |
|---|---|---|---|
| 4,625,308 | 11/1986 | Kim et al. ................................ | 370/321 |
| 5,640,395 | 6/1997 | Hamalainen et al. ................... | 370/322 |

OTHER PUBLICATIONS

IEEE Transaction on Information Theory IT–20(3), pp. 338–389 May 1974, "Adaptive Feedback Coding Scheme Using Incremental Redundancy" D.M. Mandelbaum.

Computer Applications in Electrical Engineering Series, vol. 1, Prentice–Hall 1983, "Error Control Coding—Fundamentals and Applications" S. Lin, D.J. Costello no month.

IEEE Trans. Com., vol. COM–36, No. 4, pp. 389–400, Apr. 1988, "Rate–Compatible Punctured Convolutional Codes (RCPC Codes) and Their Applications" Hagenauer J.

IEEE Trans. on Commun., vol. COM–38, No. 8, pp. 1133–1137, 1990, "Analysis of a Type II Hybrid Arq Scheme with Code Combining" S. Kallel.

The GSM System for Mobile Communications, 49, rue Louise Bruneau, F–91129 Palaiseau, France 1992, M. Mouly, Marie–B. Pautet.

Practical Implementation of a Mobile Data Link Protocol with a Type–II Hybrid ARQ Scheme and Code Combining VTC, pp. 774–777, 1993, Kallel S. Bakhtiyari S., Chen T, Leung V.

ETSI GSM 05.03 Channel Coding, Technical Report 3.5.1, Jan. 1990, European Digital Cellular Telecommunications System (phase 1) Mar. 1992.

IEEE Pacific Rim Conference On Communications, Computers and Signal Processing (Cat. No. 93CH3288–8) Kallel, S., "Complementary Punctured Convolutional (CPC) Codes and Their Use in Hybrid ARQ Schemes", pp. 186–189, vol. 1, May 1993.

Creating Tomorrow's Mobile Systems, 1994 IEEE 44th Vehicular Technology Conference, Decker, p., "An Adaptive Type –II Hybrid ARQ/FEC Protocol Suitable for GSM", pp. 330–332, vol. 1, Mar. 1994.

(List continued on next page.)

Primary Examiner—Michael Horabik
Assistant Examiner—Kevin C. Harper
Attorney, Agent, or Firm—Perman & Green, LLP

[57] ABSTRACT

The invention relates to a method for transmitting packet data in an air interface of digital cellular radio telephone system based on a hybrid forward error correction/automatic repeat request, i.e. FEC/ARQ type II, comprising the following steps for each packet: a) encoding the bits of the packet of user data, header and frame check sequence, using error correcting codes and storing the resulting bits for transmission at the sender side: b) transmitting of a predefined part of the encoded bits that is bigger than the original packet: c) collecting and storing all received data at the receiver side with a storage capacity big enough to store at least the encoded bits of one packet: d) deciding on transmission success at the receiver side, based on the stored data and sending a positive acknowledge (ACK) if the transmission has been decided to be successful and a negative acknowledgement (NAR) if not: e) checking at the sender side of the positive or negative acknowledgement (ACK or NAK) and going to step b) in case of negative acknowledge (NAK) otherwise in case of positive acknowledgement (ACK) the transmitting of the packet is being completed and the receiver storage is cleared. With this method optimum throughput in response to a fluctuation in the error rate on a packet radio channel is procided.

12 Claims, 3 Drawing Sheets

OTHER PUBLICATIONS 1993 43rd IEEE Vehicular Technology Conference, Personal Communication—Freedom Through Wireless Technology (CAT. No. 93CH3305–0) Bakhtiyari, S. et al., Practical Implementation of a Mobile Data May 1993.
Link Protocol With A Type II Hybrid ARQ Scheme and Code Combining, pp. 774–777.

IEEE Transactions On Communications, Sep. 1995, USA, Hagenaure, J.,"Source–Controlled Channel Decoding", vol. 43, No. 9, pp. 2449–2457.

IEEE Transactions On Communications, Aug. 1990, USA, Kallel, S., "Analysis of a Type II Hybrid ARQ Scheme with Code Combining", vol. 38, No. 8, Pates 1133–1137.

7th Mediterranean Electrotechnical Conference, Proceedings (CAT. No. 94CH3388–6) Taspinar, N. "Generalized Type–II Hybrid SR ARQ System Using Punctured Convolutional Coding for Point–to–Multipoint Communications", vol. 1, pp. 211–214.

IEEE International Conference On Communications ICC '90 Conference Record (CAT. No. 90CH2829–0). Niinomi, T. et al., "Selective Repeat Type –II Hybrid ARQ/FEC Scheme Using Rate–Compatible Punctured Convolutional Code", pp. 1251–1255, vol. 3 no date.

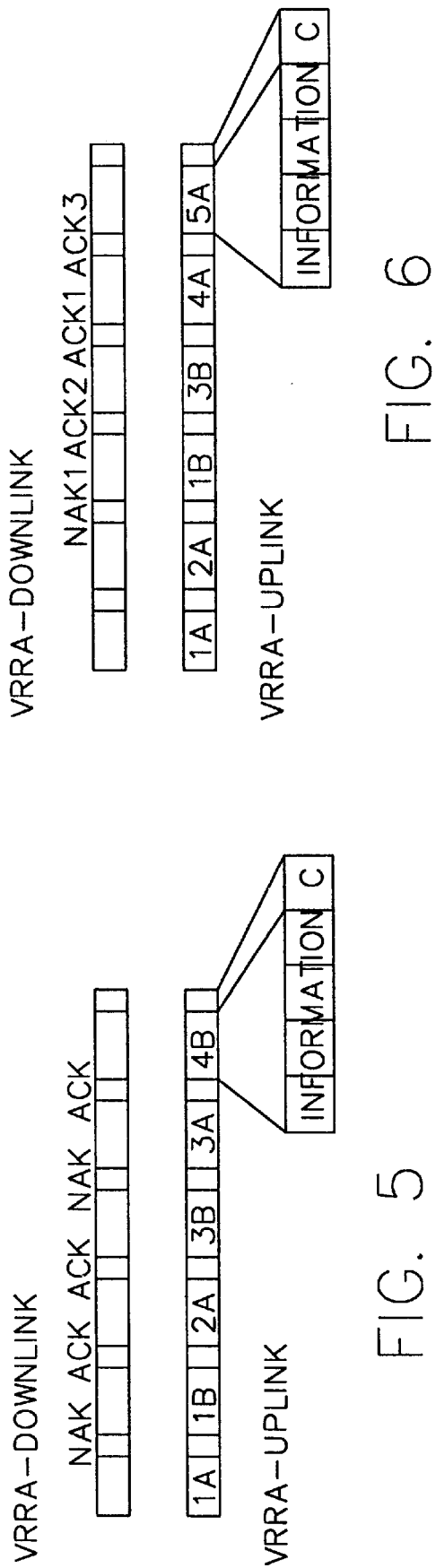

METHOD FOR TRANSMITTING PACKET DATA WITH HYBRID FEC/ARG TYPE II

BACKGROUND OF THE INVENTION

The present invention relates to data communication systems which perform transmission and reception of digital data through duplex communication systems and more particularly. to a data communication system which provides optimum throughput in response to a fluctuation in the error rate on a packet radio channel.

Protocols for data transmission developed for TD MA (Time Division Multiple Access) based radio telephone systems typically use error control mechanisms like ARQ (Automatic Repeat Request) or a hybrid ARQ scheme supported by a FEC (Forward Error Correction) to reduce the error rate for the ARQ scheme.

A typical ARQ procedure for this function is the HDLC (High Level Data Link Protocol) procedure, defined by the International Telecommunication Union (ITU ) in ITU-T X.25.

Hybrid ARQ schemes are typically combined in that form, that FEC reduces the remaining error rate as a function in layer 1 according to the ISO-OSI reference model [X 200] and ARQ as a layer 2 function. This system has to be adapted to the maximum expected remaining error rate. An example can be seen within the Radio Link Protocol (RLP), designed for circuit switched data transmission within the Global System for Mobile Communication GSM [GSM 04.22].

These prior art procedures do not achieve optimal throughput behaviour in low error rate channels due to the fixed channel coding, while reducing the basic error correction capability from the system would reduce the throughput in cases of high error rate channels.

Therefore stepwise combination of redundancy using hybrid type II ARQ/FEC schemes are proposed to get better throughput behaviour [Man-delbaum 74].

These prior art procedures are designed to be used on top of circuit switched duplex communication channels. They lose much of their efficiency if they are used on top of packet switched ratio channels due to the necessary channel reservation period for each positive or negative acknowledgement that has to be transmitted in case of errors.

SUMMARY OF THE INVENTION

It is therefore an object of the present invention to provide a data communication system which can secure a high throughput within packet radio transmission systems. even when the channel error rate is fluctuating, to be implemented e.g. within the GSM mobile radio system.

Another object of the present invention is to provide a data communication system which needs a minimum of processing effort at sender and receiver side.

In order to attain the objects there is provided a method for transmitting packet data in an air interface of a digital cellular radio telephone system based on a hybrid forward error correction/automatic repeat request, i.e. FEC/ARg type II, comprising the following steps for each packet:
 a) encoding the bits of the packet of user data, header and frame check sequence, using error correcting codes and storing the resulting bits for transmission at the sender side;
 b) transmitting of a predefined part of the encoded bits that is bigger than the original packet;
 c) collecting and storing all received data at the receiver side with a storage capacity big enough to store at least the encoded bits of one packet;
 d) deciding on transmission success at the receiver side, based on the stored data and sending a positive acknowledgement (ACK) if the transmission has been decided to be successful and a negative acknowledgement (NAK) if not;
 e) checking at the sender side of the positive or negative acknowledgement (ACK or NAK) and going to step b) in case of negative acknowledgement (NAK) otherwise in case of positive acknowledgement (ACK) the transmitting of the packet is being completed and the receiver storage is cleared.

Within the VRRA (Variable Rate Reservation Access) proposal, layer 1 frames are transmitted within blocks of 4 consecutive GSM bursts over the air interface (FIG. 1). To ensure a successful transmission a header (H) and a frame check sequence (FCS) are added to each data unit (FIG. 2). In the type I mechanism this VRRA frame is now encoded using a punctured half rate convolutional coder and transmitted in 4 consecutive GSM TD MA slots. At the receiver side, unsuccessfully received VRRA frames, detected by a mismatching frame check sequence lead to a negative acknowledgement within the next control burst (C) in the reverse direction. If no or a negative acknowledgement is received by the sender side, this is handled as a request for a retransmission of this particular layer 1 frame. Within this mechanism each received frame is decoded for its own, no data of previously received versions of the same VRRA frame are used for better decoding. So the probability of a successful transmission will not change with each transmission.

The advantage of a type II enhancement is that for a retransmission another layer 1 frame version of the VRRA frame is transmitted if no or a negative acknowledgement is received by the sender side. This different version is built by the same half rate convolutional coder using a different puncturing scheme as for the first version (FIG. 3). At the receiver side all received layer 1 frame versions related to one VRRA frame are stored within a buffer according to the puncturing scheme used at the sender side. Channel decoding is done based on all the buffered layer 1 frames. Because of the usage of all received laver 1 versions of the same VRRA frame the error correction capability of the channel coding mechanism is higher than in the type I enhancement.

Another feature to attain the objects is that in the case the immediate decision on successful transmission is not possible in time this decision on success is predicted. This is done because an exact decision on successful transmission needs a complete run of the channel decoder and cyclic redundancy check. This can only be done immediately within the next control slot if an enormous amount of processing power is included at the receiver side. If this processing power can be assumed, the procedure of transmitting a packet closes with a positive or negative acknowledgement immediatel, if not the acknowledgement will be immediately predicted.

When also no prediction is possible in time, according to the present invention the channel can be divided into subchannels in the way that the transmission of different packets is altered in consecutive air interface units as an alternative to the prediction of the acknowledgement immediately. Further Aspects of the invention are defined in the appended claims.

BRIEF DESCRIPTION OF THE DRAWINGS

The method of the invention is further described with reference to the appended drawings and tables, where:

FIG. 5 depicts the alternating use of puncturing matrixes independent on the version number of the VRRA frame;

FIG. 6 depicts the alternating use of puncturing matrixes assuming 2 subchannels;

Table 1 shows the puncturing codes of the different puncturing matrixes versions for a half rate convolutional coder; and Table 2 shows the changing procedure of the buffer if no soft decision storage is possible.

DETAILED DESCRIPTION OF THE INVENTION

At transmitter side the N bits (d(0) . . . d(N-1)) are encoded using the same half rate convolutional coder as proposed in GSiM 05.03 with the generator polynomials $$G_0(D)=D^4+D^3+1$$

$$G_1(D)=D^4+D^3+D+1$$

[GSM 05.03].

N is the length of the VRRA frame including the header (H) and the frame check sequence (FCS). For a better performance of this (2 . . . 1, 5) convolutional decoder, the encoding process is typically ended in a definite state (0) by adding 4 tall bits. This yiels to M=(N+4)·2 bits. The coding is done without any changes to the sequence number and is stored in the array c(o, k); o=1, 2; k=0 . . . M-1 using the polynomials from GSM 05.03:

$$c(o, k)=d(k)+d(k-3)+d(k-4); o=1$$

$$c(o, k)=d(k)+d(k-1)+d(k-3)+d(k-4); o=2$$

[GSM 05.03].

Now the data is punctured according to a puncturing matrix $P_A(i, j)$ to 456 bit to fit into 4 GSM normal bursts (where i=0 . . . I-1 and j=0 . . . J-1, I is equivalent to the number of lines and J is equivalent to the number of columns of the puncturing matrix). Examples for different puncturing matrixes $P_A$ and $P_B$ for different VRRA frame lengths N can be seen in table 1. Within the form of a puncturing matrix the following conventions are used: Each line belongs to the convolutional coder output with the same number, so the number of lines (I) is equivalent to the number of outputs of the convolutional coder.

The bit c (o, k ) will be transmitted if P (i=o, j=k mod J) is equal to 1.

The bit c (o, k) will not be transmitted if P(i=0, j=k mod J) is equal to 0.

If, after an errogenous transmission no positive acknowledgement is received at the sender side, the puncturing matrix has to be changed for the next transmission. Then the data in the array c(o, k) is punctured according to a puncturing matrix $P_B$ (i, j) to 456 bit to fit into 4 GSM normal bursts. Only two versions of puncturing matrixes are distinguished within the method described here to avoid necessary signaling overhead. Version A and version B are used alternating, independent on the number of transmissions of each frame. Therefore each VRRA period has to be declared as an even or odd period (FIG. 5).

Figure 1:
FIG. 1 depicts the VRRA logical channel structure.
Figure 1:
Figure 3:
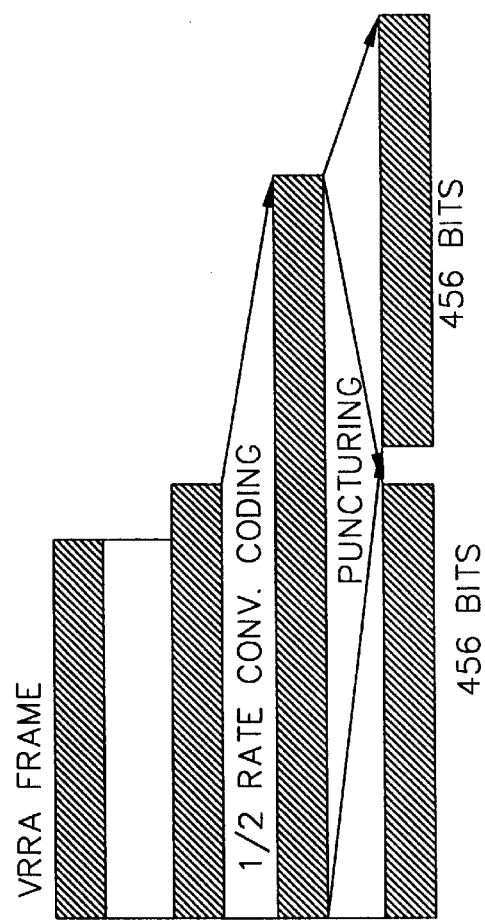
FIG. 3 depicts an encoding scheme of a frame according to VRRA type II.
Figure 2:
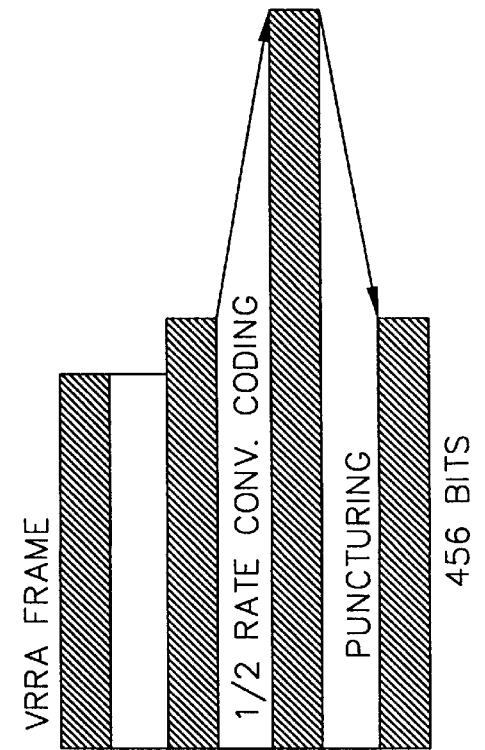
FIG. 2 depicts an encoding scheme of a frame according to VRRA type I.

In cases, where the system is not able to provide an acknowledgement within time, the channel is divided logically into K subchannels. The number of subchannels K will be constant over the lifetime of a GPRS (General Packet Radio Service) channel so that the coding scheme can be easily calculated from the frame position and has not to be transmitted over the air interface. In that case the coding scheme is altered after the acknowledgement is received, as shown in FIG. 6 with K=2 subchannels. At the receiver side all data is collected within a storage of size M. This memory will be able to store all layer 1 frame versions of one VRRA frame, as shown in FIG. 2. At the beginning of the reception or after a successful reception the buffer is cleared, see FIG. 4 step a.

Figure 4:
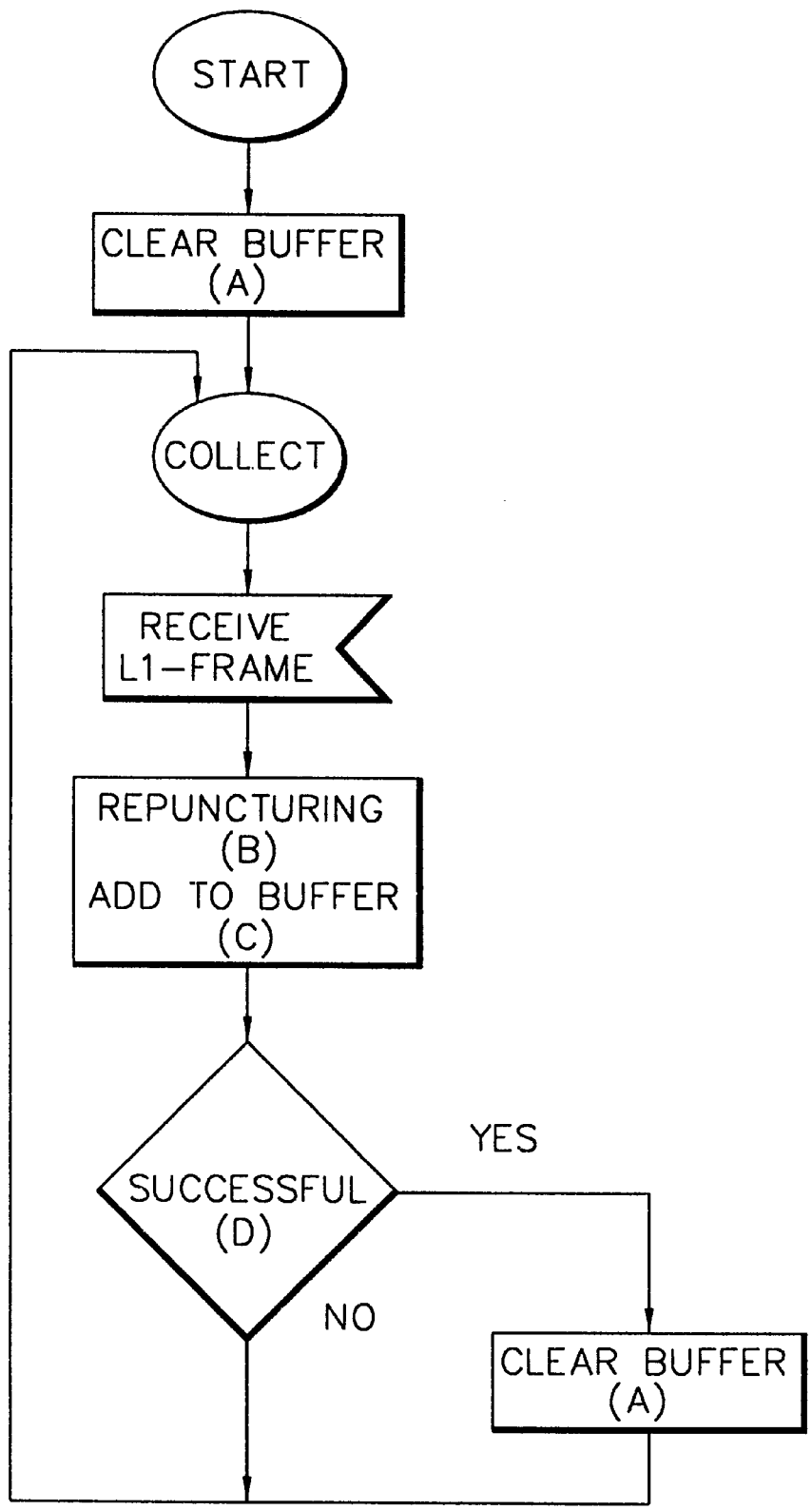
FIG. 4 depicts the buffering and decoding state diagram of the receiver side.

The receiver repunctures the received layer 1 frame using the same puncturing matrix as in the transmitter side, as seen in FIG. 4 step b. This is possible without decoding parts of the received layer 1 frame due to the alternating use of predefined puncturing matrixes. Bits which are known not to be transmitted are assigned to a random value.

When layer 1 frames are received they are added to the receiver buffer, see FIG. 4 step c. Here, two different versions are possible:

In the case that the receiver side uses soft decision decoding within the convolutional decoding algorithm, the receiver side has to store soft decision values between succeeding receptions. The soft decision values used in this decision are also known as Log-Likelihood values and can be calculated by:

$$L=ln(BER/(1-BER))$$

where BER is the estimated bit error rate each bit. Within implementations the value of the Log-Likelihood values can be limited to a resolution of e.g. 7 bit without loss of performance. This yields to a scope of BER from 1.275E-7 to 0.5 and allows to store one received bit and its Log-Likelihood value within one byte memory. This leads to a storage size of M bytes. In the procedure of clearing the buffer (FIG. 4 step a) all Log-Likelihood values are set to 0. In the procedure of assigning bits which are known not to be transmitted to a random value (FIG. 4 step b) they are assigned with a low Log-Likelihood value as 0 that describes the unknown state. Now, in the adding procedure of the received layer 1 frame to the buffer, the values of the Log-Likelihood values are added. This addition should also include the value of the received bit, which should be regarded as a sign if the addition leads to an overflow within a limited resolution of the buffer.

In the case that no soft decision decoding is used or if no soft decision can be stored, the bit positions within the buffer should be modified according to table 2, whereby x is the entry for an unknown bit.

An exact decision on a successful transmission needs a complete run of the channel decoder and cyclic redundancy check. This can only be done immediately within the next control slot if an enormous amount of processing power is included at the receiver side. If this processing power can be assumed the procedure closes with the positive or negative acknowledgement immediately, as can be seen in FIG. 4 step c.

If an exact decision on successful transmission is not possible immediately, there are the following two solutions:

Delayed Exact Acknowledgement

To avoid the transmission of a layer 1 frame number, the logical channel structure should be divided into D subchannels, where D is the number of consecutive layer 1 frames that have to be received until an exact acknowledgement can be given. There has to be a buffer for each of these D subchannels. This scheme is shown in FIG. 6 with D=2 subchannels.

Immediate Predicted Acknowledgement

As an alternative to the exact decision, a predicted decision can be made directly after reception of a layer 1 frame if the prediction algorithm can be realized with a limited number of processor instructions. This can be done in a very easy way by adding all soft decision values stored in the receivers buffer. This value can be interpreted as a Log-Likeihood value the buffer contents. If this value keeps within a given limit (L) further information is requested by the receiver side. Therefore, a negative acknowledgement is sent to the transmitter side. If the sum exceeds the limit (L) a positive acknowlegement is sent to the transmitter side and the channel decoding process will be started.

The value (L) has to be optimized by simulation to the radio channel because this method can decrease throughput in two ways: First, if the request-limit (L) is too low, the probability of unnecessary requests is high, and on the other side, if the request limit (L) is too high, this will cause a high delay by retransmissions upon late decisions of the layer 1 or alternatively layer 2 ARQ protocol.

What is claimed is:

1. A method for transmitting packet data in an air interface of digital cellular radio telephone system based on a hybrid forward error correction/automatic repeat request, i.e. FEC/ARQ type II, comprising the following steps for each packet:
   a) encoding the bits of the packet of user data, header and frame check sequence, using error correcting codes and storing the resulting bits for transmission at the sender side;
   b) transmitting a predefined part of the encoded bits that is bigger than the original packet;
   c) collecting and storing all received data at the receiver side with a storage capacity big enough to store at least the encoded bits of one packet;
   d) deciding on transmission success at the receiver side, based on the stored data and sending a positive acknowledge (ACK) if the transmission has been decided to be successful and a negative acknowledgment (NAK) if not;
   e) checking at the sender side of the positive or negative acknowledgment (ACK or NAK) and going to step b) in case of negative acknowledge (NAK) otherwise in case of positive acknowledgment (ACK) the transmitting of the packet is being completed and the receiver storage is cleared; and
   wherein, in the case of the negative acknowledgment, said step of transmitting a predefined part of the encoded bits is via a first transmission, and there are further steps of transmitting the encoded packet bits via a second transmission, collecting and storing all received data of the second transmission at the receiver side, and calculating packet data from said first and said second transmissions.

2. The method for transmitting packet data as claimed in claim 1, wherein the size of Air-Interface-Units is constant and can be carried by an undivided number of TDMA bursts, i.e. 456 bit, as in 4 GSM bursts.

TABLE 1

| Overall Coding rate (R) | VRRA frame length N | Puncturing matrix (Version A) | Puncturing matrix (Version B) |
|---|---|---|---|
| 1/2 | 224 | $P_A = \begin{bmatrix} 1 \\ 1 \end{bmatrix}$ | $P_B = \begin{bmatrix} 1 \\ 1 \end{bmatrix}$ |
| 2/3 | 300 | $P_A = \begin{bmatrix} 1 & 1 \\ 1 & 0 \end{bmatrix}$ | $P_B = \begin{bmatrix} 0 & 1 \\ 1 & 1 \end{bmatrix}$ |
| 3/4 | 338 | $P_A = \begin{bmatrix} 1 & 0 & 1 \\ 1 & 1 & 0 \end{bmatrix}$ | $P_B = \begin{bmatrix} 1 & 1 & 0 \\ 0 & 1 & 1 \end{bmatrix}$ |
| 4/5 | 360 | $P_A = \begin{bmatrix} 1 & 0 & 1 & 0 \\ 1 & 1 & 0 & 1 \end{bmatrix}$ | $P_B = \begin{bmatrix} 1 & 1 & 0 & 1 \\ 1 & 0 & 1 & 0 \end{bmatrix}$ |
| 5/6 | 375 | $P_A = \begin{bmatrix} 1 & 0 & 1 & 1 & 1 \\ 1 & 1 & 0 & 0 & 0 \end{bmatrix}$ | $P_B = \begin{bmatrix} 1 & 1 & 0 & 0 & 0 \\ 1 & 0 & 1 & 1 & 1 \end{bmatrix}$ |
| 6/7 | 386 | $P_A = \begin{bmatrix} 1 & 0 & 1 & 0 & 1 & 0 \\ 1 & 1 & 0 & 1 & 0 & 1 \end{bmatrix}$ | $P_B = \begin{bmatrix} 1 & 1 & 0 & 1 & 0 & 1 \\ 1 & 0 & 1 & 0 & 1 & 0 \end{bmatrix}$ |

TABLE 2

| old buffer entry | received bit | new buffer entry |
|---|---|---|
| X | X | X |
| X | 0 | 0 |
| X | 1 | 1 |
| 0 | X | 0 |
| 0 | 0 | 0 |
| 0 | 1 | X |
| 1 | X | 1 |
| 1 | 0 | X |
| 1 | 1 | 1 |

3. The method for transmitting packet data as claimed in claim 1, wherein a convolutional coder with coding rate ½ is used for encoding the bits of the packet of user data at the sender side.

4. The method for transmitting packet data as claimed in claim 1, wherein the predefined part of the encoded data that is transmitted on a Air-Interface-Unit is predetermined i.e. by the number of this Air-Interface-Unit.

5. The method for transmitting packet data as claimed in claim 1, wherein, in case of soft decision decoding, the receiver side will store additionally the log-likelihood-values of each bit $$L=-ln(p/(1-p))$$

where p is the estimated error probability for each bit.

6. The method for transmitting packet data as claimed in claim 1, wherein, in the case the immediate decision on successful transmission is not possible in time, the success is predicted.

7. The method for transmitting packet data as claimed in claim 1, wherein, in the case that no acknowledgment is received at the sender side, a negative acknowledge (NAK) is assumed.

8. The method for transmitting packet data as claimed in claim 6, wherein, in the case that no prediction is possible in time, the channel has to be divided into subchannels in the way that the transmission of different packets is altered in consecutive Air-Interface-Units.

9. A method for transmitting packet data in an air interface of a digital cellular radio telephone system based on a hybrid forward error correction/automatic repeat request, i.e. FEC/ARQ type II, comprising the following steps for each packet:

a) encoding the bits of the packet of user data, header and frame check sequence, using error correcting codes and storing the resulting bits for transmission at the sender side;

b) transmitting a predefined part of the encoded bits that is bigger than the original packet;

c) collecting and storing all received data at the receiver side with a storage capacity big enough to store at least the encoded bits of one packet;

d) deciding on transmission success at the receiver side, based on the stored data and sending a positive acknowledge (ACK) if the transmission has been decided to be successful and a negative acknowledgment (NAK) if not;

e) checking at the sender side of the positive or negative acknowledgment (ACK or NAK) and going to step b) in case of negative acknowledgment (NAK) otherwise in case of positive acknowledgment (ACK) the transmitting of the packet is being completed and the receiver storage is cleared;

wherein, in the case the immediate decision on successful transmission is not possible in time, the success is predicted and the prediction is based on the stored data including log-likelihood-values and the number of not successful receptions.

10. A method for transmitting packet data in an air interface of a digital cellular radio telephone system based on a hybrid forward error correction/automatic repeat request, comprising the following steps for each packet:

encoding the bits of the packet of user data, header and frame check sequence, using error correcting codes and storing the resulting bits for transmission at the sender side;

transmitting a predefined part of the encoded bits that is bigger than the original packet;

storing all received data at the receiver side including the encoded bits of one packet;

deciding on transmission success at the receiver side, and communicating a decision of the success to the sender side;

re-transmitting the predefined part of the encoded bits that is bigger than the original packet in the event of an adverse decision on the success of transmission; and predicting the success of a transmission based on the stored data including log-likelihood values of transmitted bits in the case wherein there is no immediate decision on the success of the transmission.

11. The method for transmitting packet data as claimed in claim 10, wherein the predicting is based also on the number of not successful receptions.

12. A method for transmitting packet data in an air interface of a digital cellular radio telephone system based on a hybrid forward error correction/automatic repeat request, comprising the following steps for each packet:

encoding the bits of the packet of user data, header and frame check sequence, using error correcting codes and storing the resulting bits for transmission at the sender side;

transmitting a predefined part of the encoded bits that is bigger than the original packet;

storing all received data at the receiver side including the encoded bits of one packet;

deciding on transmission success at the receiver side, and communicating a decision of the success to the sender side;

re-transmitting the predefined part of the encoded bits that is bigger than the original packet in the event of an adverse decision on the success of transmission;

storing all received data at the receiver side including the encoded bits of one packet received during said re-transmission step; and calculating packet data from said first and said second transmissions.

* * * * *